(12) United States Patent
Sharma et al.

(10) Patent No.: US 12,314,300 B1
(45) Date of Patent: May 27, 2025

(54) METHODS AND SYSTEMS OF CONTENT INTEGRATION FOR GENERATIVE ARTIFICIAL INTELLIGENCE

(71) Applicant: OPEN TEXT INC., Wilmington, DE (US)

(72) Inventors: Vikash Sharma, Bengaluru (IN); Laxman Singh Chauhan, Bengaluru (IN); Raja Parshotam Lalwani, Bengaluru (IN)

(73) Assignee: Open Text Inc., Wilmington, DE (US)

( * ) Notice: Subject to any disclaimer, the term of this patent is extended or adjusted under 35 U.S.C. 154(b) by 0 days.

(21) Appl. No.: 18/399,684

(22) Filed: Dec. 28, 2023

(51) Int. Cl.
  *G06F 16/334* (2025.01)
  *G06F 40/40* (2020.01)

(52) U.S. Cl.
  CPC .......... *G06F 16/3347* (2019.01); *G06F 40/40* (2020.01)

(58) Field of Classification Search
  CPC .............................. G06F 16/3347; G06F 40/40
  See application file for complete search history.

(56) References Cited

U.S. PATENT DOCUMENTS

| | | | |
|---|---|---|---|
| 2005/0119891 A1* | 6/2005 | Chu | G10L 13/07 704/260 |
| 2020/0097808 A1* | 3/2020 | Thomas | G06Q 10/063 |
| 2020/0387676 A1* | 12/2020 | Kim | G10L 15/16 |
| 2021/0097097 A1* | 4/2021 | Alkan | G06F 16/3329 |
| 2022/0122357 A1* | 4/2022 | Zhao | G06V 10/82 |
| 2023/0066314 A1* | 3/2023 | Anand | G06F 16/335 |
| 2023/0281389 A1* | 9/2023 | Lee | H04L 51/02 704/9 |
| 2024/0004873 A1* | 1/2024 | Yadav | G06Q 10/1095 |
| 2024/0168952 A1* | 5/2024 | Rahman | G06F 16/24542 |

* cited by examiner

*Primary Examiner* — Etienne P Leroux
(74) *Attorney, Agent, or Firm* — Sheridan Ross P.C.

(57) ABSTRACT

Systems and methods are provided for a device to obtain a query, such as from a user. The query is vectorized to obtain a numerical representation of the query and provided to a vector database to find the nearest vectors corresponding to most relevant context, such as for a particular domain or subject matter. The query, query vector, and context vectors, and optionally past query history and past query responses, are provided to an artificial intelligence, such as a large language model (LLM), to receive a response to the query without providing the context to the LLM.

20 Claims, 5 Drawing Sheets

METHODS AND SYSTEMS OF CONTENT INTEGRATION FOR GENERATIVE ARTIFICIAL INTELLIGENCE

FIELD OF THE DISCLOSURE

The invention relates generally to systems and methods for an artificial intelligent system and particularly to context embellished queries for use with an untrained artificial intelligence.

BACKGROUND

Artificial intelligence is often embodied as a trained neural network. An untrained or insufficiently trained neural network will respond to queries with a large number of errors, often referred to as hallucinations. Training a neural network often entails providing training data to the neural network and corrective information when the neural network produces an error. Training a neural network to reduce the number of hallucinations to an acceptable level, even when limited to a particular domain (e.g., subject, topic, etc.), may require a significant amount of processing time and/or computational resources. Banks of expensive and power-intensive processors, such as graphical processing units (GPUs), are often deployed to train a neural network on a first set of data and to retrain, such as to add new content to the training set, in attempt to resolve a hallucination. Occasionally, a hallucination is so prevalent, or consequential, that retraining fails to correct the error, or the error makes the neural network unusable, and the entire training set is purged. The erroneous data in the training set is identified and the neural network is retrained. Accurately identifying the erroneous or absent data that caused the hallucination is rarely possible and, as a result, modifying the training data and retraining the neural network to resolve the hallucination is often a trial-and-error task. Without such a commitment of resources, training is often curtailed, resulting in more hallucinations and impairing usability.

SUMMARY

The foregoing and other needs are addressed by the various embodiments and configurations of the present invention. The present invention can provide a number of advantages depending on the particular configuration. These and other advantages will be apparent from the disclosure of the invention(s) contained herein.

As a general introduction, and in one embodiment, systems and methods are provided that utilize an artificial intelligence (AI), such as a neural network executing a large language model (LLM), that omits prior training in a domain but accurately responds to a query. Although the LLM is untrained with respect to the domain, the LLM may have training in general reasoning and/or content (e.g., how to parse a question, how to formulate a response, the meaning of English words and phrases, etc.) but may be otherwise absent domain knowledge. The query presented to the AI comprises encoded generated context, and thereby omits the need for prior training of the AI with respect to a domain. The domain knowledge is provided as encodings from a data source, such as a content repository containing content that may include, but is not limited to, documents, audio files, video files, images, application data files, etc.

In another embodiment, context used for the query is generated from the data source; however, the content of the data source itself is not provided to the AI. The content of the data source is parsed and processed into vectors and may be stored in a vector database as context vectors. The vectors are created by parsing the content and determining therefrom a numerical value, commonly a floating-point value, for the parsed content. Parsing is variously embodied and may be determined, at least in part, on the type of content. For example, textual data may be parsed into paragraphs, sentences, word combinations, single words, and/or word portions (e.g., via tokenization). Graphical data may be parsed into shapes (e.g., an interior with an edge determined by an edge detection algorithm, people, faces, text, symbols, etc.), a collection of shapes, individual pixels (e.g., color values, brightness values, etc.), groupings of similar pixels, etc. For graphical data in series (e.g., video), parsing may be or include a particular frame or timestamp. For audio, parsing may include transcribed (textual) content, sound, whether voice (e.g., frequency, amplitude, phoneme, etc.) and/or non-voice (e.g., machinery, vehicles, nature, etc.), vocalized attributes (e.g., apparent gender, emotion, volume, pace, timber, etc.), and/or a time or other temporal location within the audio file. These and other types of data sources (e.g., executable files, application data files, etc.) may similarly be parsed based on the content therein (e.g., the data itself) and/or data about the content or file (e.g., metadata).

The vectorization of the data sources is variously embodied and, in one embodiment, a vector is parsed and assigned a numerical value based on relevancy on a dimension modeled in memory space of a computer memory for a particular domain. In one simplified example, a vector is assigned a value based on proximity to points along an axis describing a subject. However, there may be scores (vectors) for each of many axes, each axis relating to a particular subject or variation on a subject.

In another embodiment, a user's query is combined with the vectorized context to produce a natural language answer. As a result, two identical queries to the same LLM will produce results based on the context provided. Responses to queries are based on the context at the time of the query. As the context changes over time, no additional training is required to produce results based on the then-current context. If a query returns a response that is determined to be a hallucination, the LLM remains content agnostic and does not require retraining to remove the error-producing content. Instead, once the error-producing content is identified, the error-producing content is excluded from subsequent queries to obtain a result without the hallucination.

In another embodiment, vectors are created for the context (e.g., a data repository). A query is received and the query embeddings determined. The query embeddings are then converted to at least one query vector and compared to the context vectors to determine the query's relevant context. The query's context may then be used to enhance the search used to produce a result to the query. Additionally, queries may be cached for subsequent and/or multiple uses.

In another embodiment, content is maintained in a vector database, such as one having key-value pairs for "text chunks," which may be words, word portions, phrases, etc., that have a single particular meaning. A text chunk and/or query are converted to numeric values, such as by existing techniques provided by other AI vendors (e.g., Google "Text Embedding-Gecko"). The embeddings may then be stored in a vector database. A query may also be converted to a numeric representation, such as a floating-point value, to find the closest context vector, such as a nearest neighbor (NNN) to the set of vectors of the context. A threshold number, commonly five to ten, NNN results are then obtained which are associated with the top most relevant text chunks to the query. Optionally, if the resulting NNN distance(s) is greater than a threshold value, a reply indicating answerability may be provided in response to the query, such as, "I don't know."

In some aspects, the techniques described herein relate to a method, including: accessing a query; vectorizing the query to obtain a query vector; vectorizing a context to obtain context vectors; providing the context vectors and the query vector to a neural network; receiving from the neural network a response to the query vector corresponding to a closest context vector of the context vectors to the query vector; and providing the response as a human language response.

In some aspects, the techniques described herein relate to a method, wherein the neural network is external from the context.

In some aspects, the techniques described herein relate to a method, wherein the closest context vector is a next nearest neighbor.

In some aspects, the techniques described herein relate to a method, further including, upon determining a distance between the closest context vector and the query vector is greater than a previously determined threshold, retrieving the response including an indicium of answerability.

In some aspects, the techniques described herein relate to a method, further including, upon determining that each of a plurality of closest context vectors are within a previously determined distance to the query vector, receiving a plurality of responses including the plurality of closest context vectors.

In some aspects, the techniques described herein relate to a method, wherein providing the context vectors and the query vector to the neural network further includes providing a chat history including at least one previous query, received before the query, and a previous response to at least one previous query received from the neural network.

In some aspects, the techniques described herein relate to a method, wherein providing the context vectors and the query vector to the neural network further includes providing a closest subset of context vectors determined by cosine distance of the query vector to the context vectors.

In some aspects, the techniques described herein relate to a method, wherein the closest subset of context vectors includes between five and ten context vectors closest to the query vector.

In some aspects, the techniques described herein relate to a system including: a processor coupled to a computer memory having stored thereon instructions that cause the processor to perform: accessing a query; vectorizing the query to obtain a query vector; providing the query vector to a vector database to receive therefrom a set of nearest context vectors; providing the set of nearest context vectors, the query vector, and the query to a neural network and receiving therefrom a response; and providing the response as a human language response.

In some aspects, the techniques described herein relate to a system, wherein the instructions further cause the processor to: access context from a repository; vectorize the context to obtain context vectors; and write the context vectors to the vector database, a subset thereof including the set of nearest context vectors.

In some aspects, the techniques described herein relate to a system, wherein the context includes at least one of a document, a video file, an audio file, an image file, or a computer application data file.

In some aspects, the techniques described herein relate to a system, wherein the set of nearest context vectors include a set of next nearest neighbors (NNN).

In some aspects, the techniques described herein relate to a system, wherein vectorizing the query to obtain the query vector includes: providing the query to an embedding generation service and obtaining therefrom a unique numerical representation of the query; and wherein the query vector further includes the query paired with the unique numerical representation of the query.

In some aspects, the techniques described herein relate to a system, wherein providing the query to the embedding generation service and obtaining therefrom the unique numerical representation of the query further includes: segmenting the query into a number of text chunks; providing each of the number of text chunks to the embedding generation service and obtaining therefrom a number of unique numerical representation for each of the number of text chunks; and wherein a number of query vectors, including at least the query vector, each include one of the number of query vectors each of the number of query vectors include one of the number of text chunks and corresponding unique numerical representation of one of the number of text chunks.

In some aspects, the techniques described herein relate to a system including: a processor coupled to a computer memory having stored thereon instructions that cause the processor to perform: vectorizing a query to obtain a query vector; vectorizing a context to obtain context vectors; providing the context vectors and the query vector to a neural network; receiving from the neural network a response to the query vector corresponding to a closest context vector of the context vectors to the query vector; and providing the response as a human language response.

In some aspects, the techniques described herein relate to a system, wherein the neural network is external from the context.

In some aspects, the techniques described herein relate to a system, wherein the closest context vector is a next nearest neighbor.

In some aspects, the techniques described herein relate to a system, further including, upon determining a distance between the closest context vector and the query vector is greater than a previously determined threshold, retrieving the response including an indicium of answerability.

In some aspects, the techniques described herein relate to a system, further including, upon determining that each of a plurality of closest context vectors are within a previously determined distance to the query vector, receiving a plurality of responses including the plurality of closest context vectors.

In some aspects, the techniques described herein relate to a system, wherein providing the context vectors and the query vector to the neural network further includes providing a chat history including at least one previous query, received before the query, and at least one previous response to the at least one previous query received from the neural network.

A system on a chip (SoC) including any one or more of the above aspects or aspects of the embodiments described herein.

One or more means for performing any one or more of the above or aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects or aspects of the embodiments described herein, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures.

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
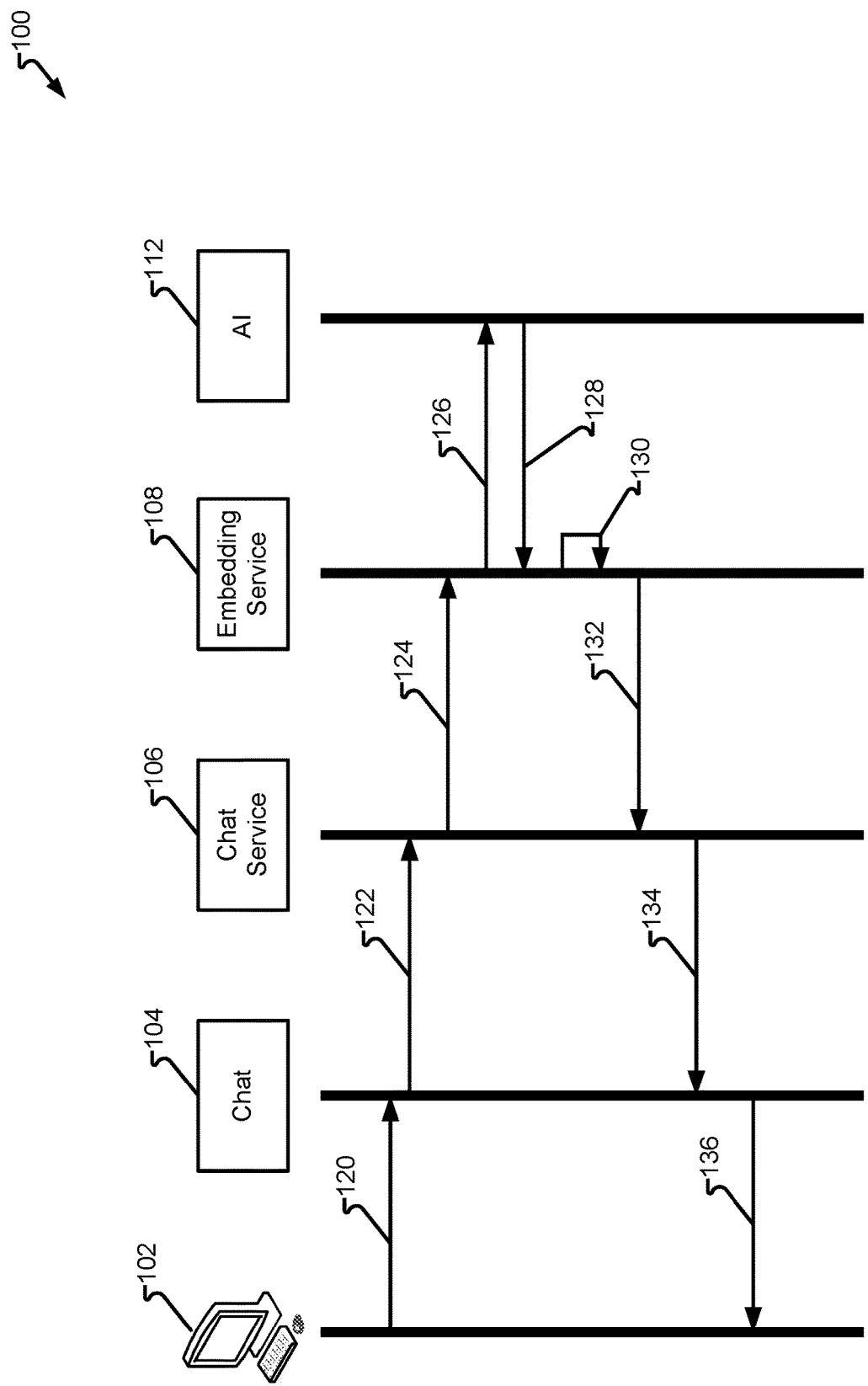
FIG. 1 depicts a process in accordance with embodiments of the present disclosure.

FIG. 1 depicts process 100 in accordance with embodiments of the present disclosure. In one embodiment, a user utilizes device 102 and the input-output components thereof. In step 120, device 102 submits a document to chat 104. Step 120 may comprise uploading one or more documents or selecting or otherwise designating the one or more documents. In step 122, chat 104 requests to submit context, such as documents, to chat service 106. In turn, at step 124, chat service 106 requests the generation of document embeddings from embedding service 108. In step 126, embedding service 108 requests AI 112 to generate the embeddings also known as vectors for the context.

AI 112 responds to embedding service 108, in step 128, with the embeddings. In step 130, embedding service 108 stores the embeddings. In step 132, embedding service 108 responds to chat service 106 with the embeddings generated for the document. In step 134, chat service 106 replies to chat 104 to acknowledge submission of the document. In step 136, chat 104 provides acknowledgment to a user via device 102 that the document has been submitted to AI 112.

It will be appreciated by those of skill in the art that process 100 may be repeated for more than one document or more than one document may be concurrently submitted and processed without departing from the scope of the embodiments herein. Furthermore, while the embodiments utilize a document for illustrative purposes, domain content other than documents (e.g., videos, audio, images, application data files, etc.) may similarly be utilized.

Figure 2:
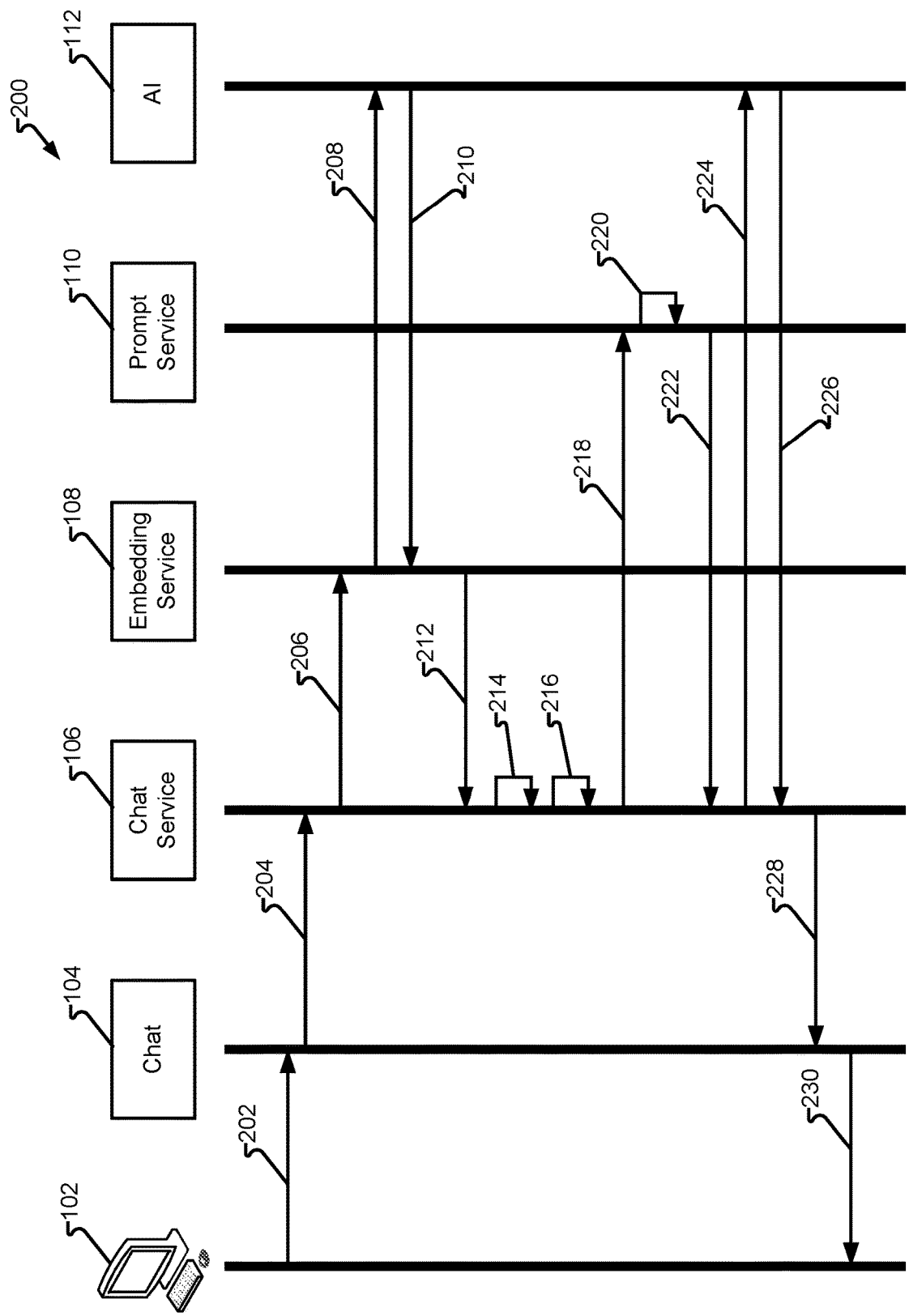
FIG. 2 depicts a process in accordance with embodiments of the present disclosure.

FIG. 2 depicts process 200 in accordance with embodiments of the present disclosure. In one embodiment, a user utilizes device 102 and the input-output components thereof. In step 202, device 102 issues a query to chat 104. In step 204, chat 104 submits the query to chat service 106. In step 206, chat service 106 submits a request to embedding service 108 to generate embeddings for the query and thereby produce a query vector. In step 208, embedding service 108 requests AI 112 to generate the embeddings.

AI 112 responds to embedding service 108 with embeddings, in step 210. In step 212, embedding service 108 responds to chat service 106 with the generated embeddings. In step 214, chat service 106 fetches the chat history (if any). In step 216, chat service 106 performs a cosine distance search to find the nearest embeddings for the search context using the embeddings for the query. In step 218, a request to generate a prompt is submitted by chat service 106 to prompt service 110. In step 220, prompt services utilize the query, context, and chat history to generate a prompt and, in step 222, respond to chat service 106 with the generated prompt. In step 224, chat service 106 submits the generated prompt to AI 112 and receives a response in step 226. The response is then provided by chat service 106 to chat 104, in step 228 and, in step 230, the response is provided to device 102.

Figure 3:
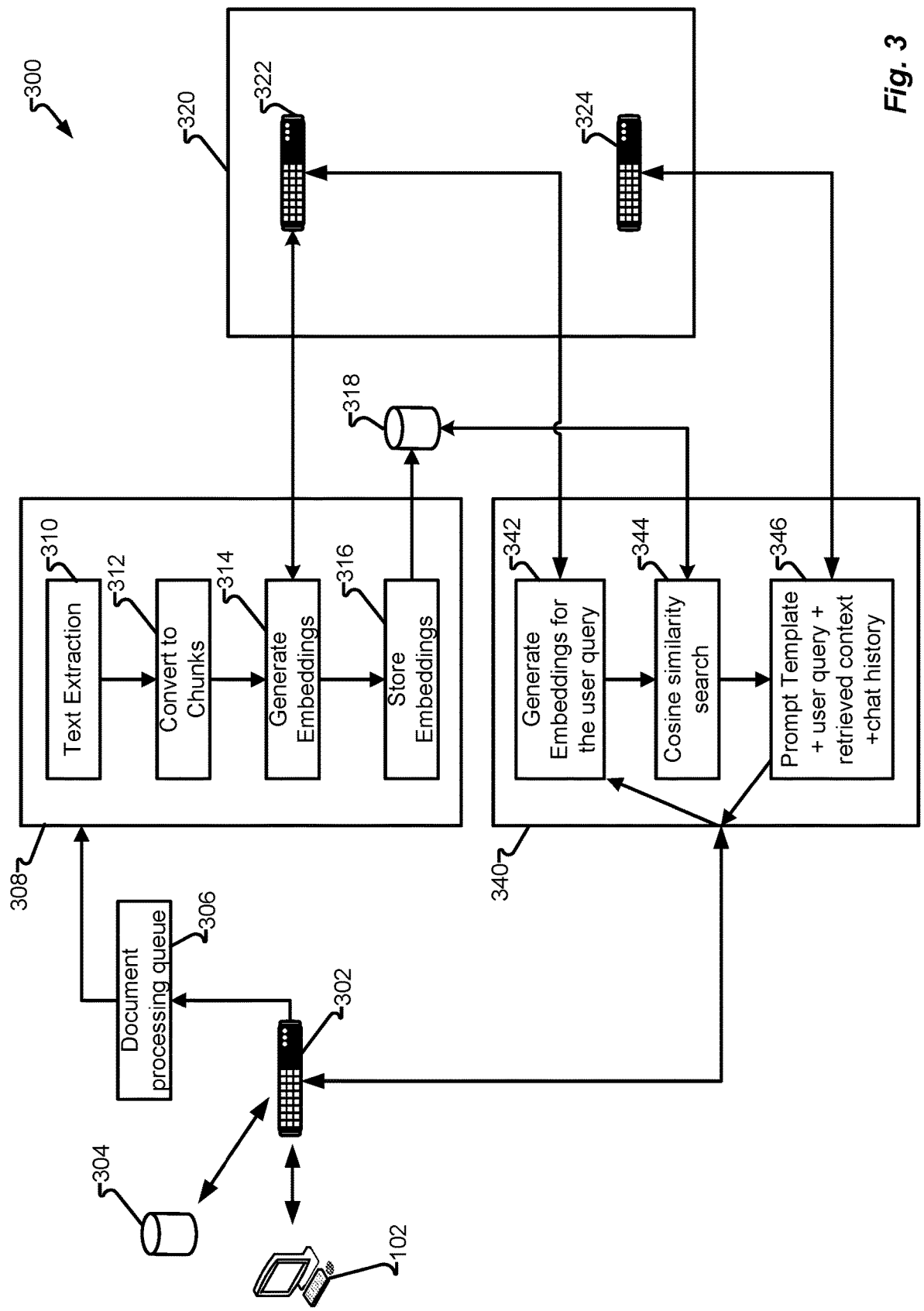
FIG. 3 depicts a data flow in accordance with embodiments of the present disclosure.

FIG. 3 depicts data flow 300 in accordance with embodiments of the present disclosure. As an overview, and in one embodiment, a user utilizes device 102 to interact with server 302 performing an interface service to domain content database 304. Domain content database 304 comprises context for a particular query; however, embedding generation service 322 and question and answer service 324 have no access to domain content database 304 or the content therein except for the generated vectors provided herein. LLM APIs 320 may be provided by one or more LLM sources. Documents are preprocessed, comprising vectorizing the content of the documents such that their embeddings are maintained as vectors in vector database 318 from embeddings obtained from a first LLM application programming interface (API) to a service, such as embedding generation service 322. When a query is received by device 102, the query is vectorized, wherein the query is provided, along with additional content, to a second LLM API, such as question and answer service 324. In another embodiment, chat 104 and/or chat service 106 may be provided by a processor of server 302 and/or document processing queue 306 executing machine-readable instructions maintained in a non-transitory memory. In another embodiment, embedding service 108 may be performed, in whole or in part, by a processor of embedding generation service 322 executing machine-readable instructions maintained in a non-transitory memory and/or a server performing embeddings generation and storage service 308. In another embodiment, prompt service 110 may be performed by a processor of a server performing prompt engineering service 340. In another embodiment, AI 112 may be a processor of embedding generation service 322 executing machine-readable instructions maintained in a non-transitory memory. In another embodiment, any one or more of server performing embeddings generation and storage service 308, prompt engineering service 340, embedding generation service 322, and/or question and answer service 324 may comprise a neural network.

In another embodiment, a user utilizes device 102 and the input-output components thereof. Server 302 provides networking and/or computational services, such as providing a plug-in service to domain content database 304. Optionally, document processing queue 306 enqueues a query received by device 102. The query is submitted to embeddings generation and storage service 308. Generation and storage service 308 utilizes text extraction 310 to vectorize the queries by extracting the text of the query and providing the extracted text to convert to chunks 312, the chunks provided to generate embeddings 314, known as vectors in vector database 318, which in turn obtains embeddings from embedding generation API, and store embeddings 316 stores the embeddings in vector database 318. While certain advantages may be realized by preprocessing the contents that will be utilized as the domain for a query, in other embodiments, domain content is processed in response to a query.

A query is received by device 102, which may be further managed by server 302. The query is processed by contractual chat/prompt engineering service 340. First, generate embeddings 342 generates the vectors utilizing embedding generation service 322. Next, cosine distance search 344 is performed wherein vector database 318 is accessed to identify the relevant documents for the query, which may be referred to as the context of the query. Prompt generation 346 generates a prompt from the query and received context. Optionally, query 346 utilizes a chat history, such as the last five queries, to provide additional context. Then, question and answer service 324 is provided with the user's query and the retrieved context. Additionally or alternatively, the prompt may further comprise a prompt template and a chat history, such as the last five queries received by device 102. A response is retrieved form question and answer service 324 and provided back to device 102 as the answer to the user's query.

Figure 4:
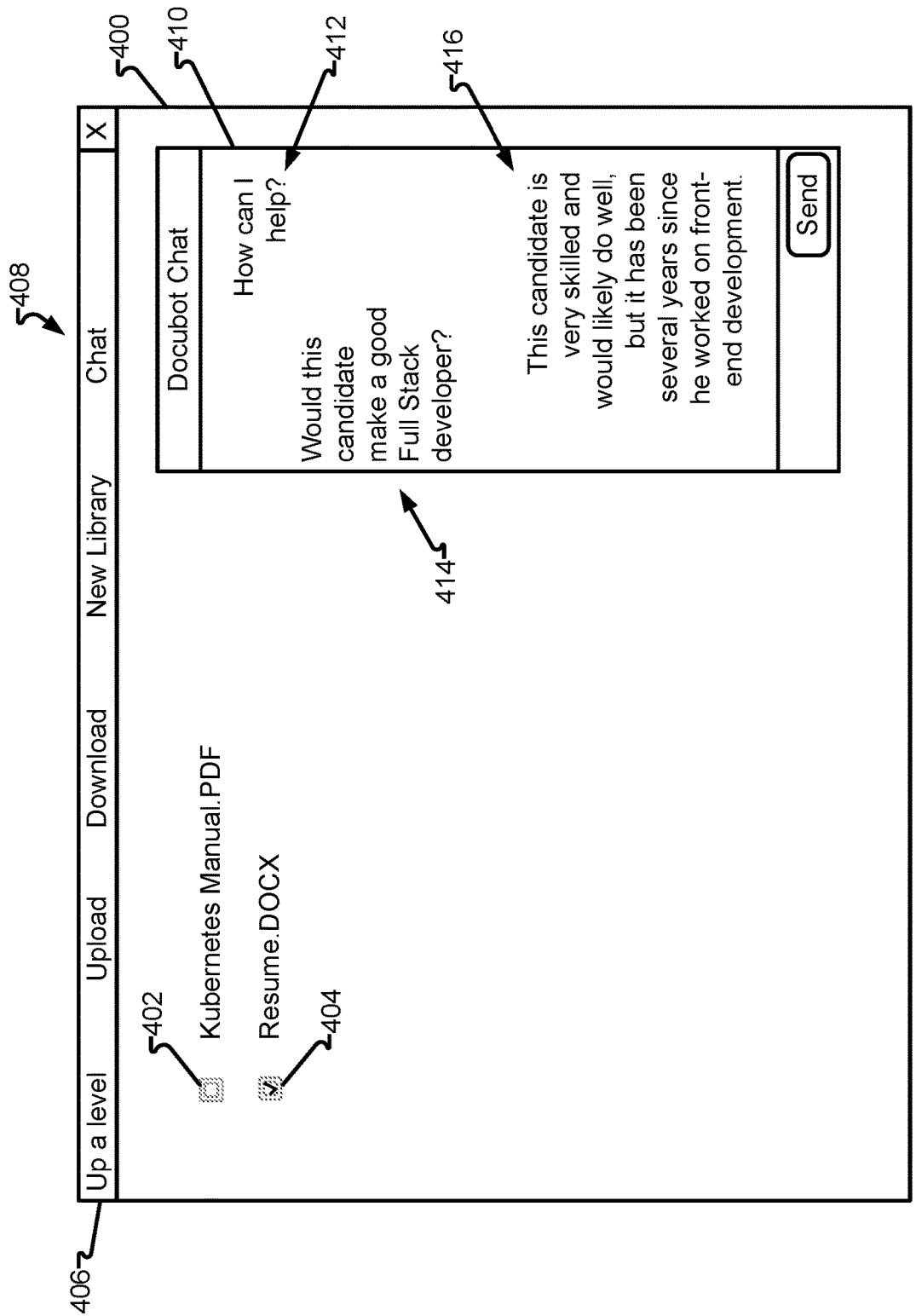
FIG. 4 depicts a display in accordance with embodiments of the present disclosure.

FIG. 4 depicts display 400 in accordance with embodiments of the present disclosure. In one embodiment, display 400 is presented on a display, such as a screen or other display of device 102. Display 400 presents a number of documents for selection via checkbox 402 and checkbox 404. It should be appreciated that other selection means and/or types of documents (e.g., images, videos, etc.) may be presented and available for selection. Similarly, other means to select a particular document(s) may be utilized without departing from the scope of the embodiments.

A user interacting with display 400 may be interested in a particular job candidate and check checkbox 404. The user may then select options from menu 406, such as chat 408, to launch chat dialog 410. Optionally, if not previously performed, in response to the user selecting at least one document and initiating the chat bot via launching chat dialog 410, process 100 may be initiated (see FIG. 1).

Next, process 200 may be initiated (see FIG. 2), in response to the user selecting at least one document and initiating the chat bot via launching chat dialog 410 and after process 100. For example, selecting chat 408 may initiate process 200 wherein chat 104 and/or chat service 106 are initiated and utilize dialog 410 as a human-machine interface. After introduction 412, a user submits question (e.g., a query) 414 via chat dialog 410. In response, process 200 may be performed in order to present an answer, such as reply 416. In particular, AI 112 is presented with embeddings determined from question 414 and embeddings from the selected document (e.g., "Resume.DOCX"), such as via embedding service 108, such as via a generated prompt (see step 224 of FIG. 2). Additionally or alternatively, the generated prompt may include a history of past chat interactions, such as the last five interactions, and the retrieved context from process 100. As a result, terms like "this candidate" can be associated with the individual referenced in the selected document. Conversely, AI 112 will not consider an unselected document due as the document was not selected (i.e., checkbox 402 is unchecked). For example, AI 112 will not consider whether Kubernetes would make a good Full Stack developer. In contrast, an AI that is trained in the prior art with a domain of documents, and presented with the same question, may provide an answer related to whether or not Kubernetes would make a good Full Stack developer.

Figure 5:
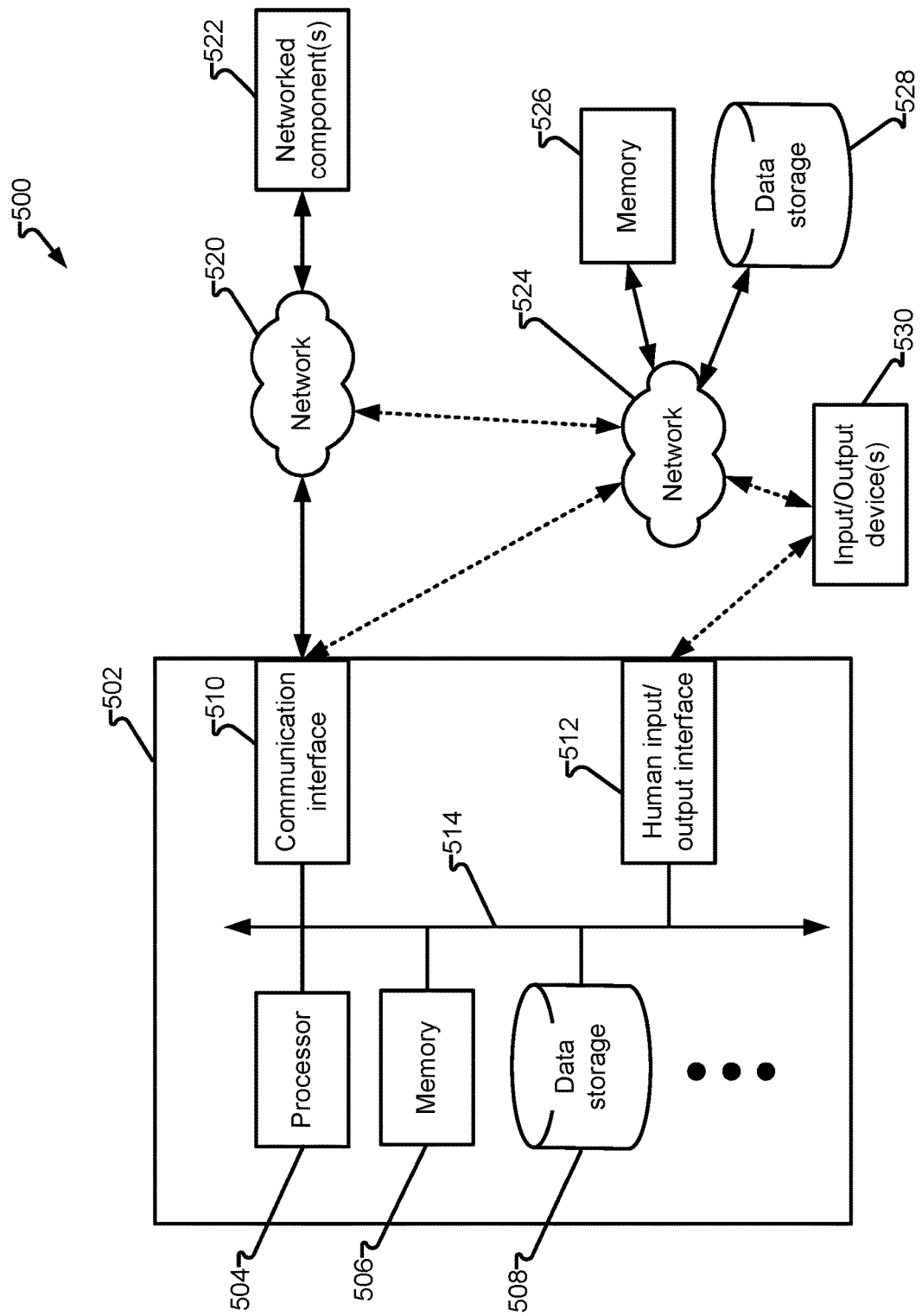
FIG. 5 depicts a device of a system in accordance with embodiments of the present disclosure.

FIG. 5 depicts device 502 in system 500 in accordance with embodiments of the present disclosure. In one embodiment, one or more of device 102, server 302, embedding generation service 322, question and answer service 324 may be embodied, in whole or in part, as device 502 comprising various components and connections to other components and/or systems. The components are variously embodied and may comprise processor 504. The term "processor," as used herein, refers exclusively to electronic hardware components comprising electrical circuitry with connections (e.g., pin-outs) to convey encoded electrical signals to and from the electrical circuitry. Processor 504 may comprise programmable logic functionality, such as determined, at least in part, from accessing machine-readable instructions maintained in a non-transitory data storage, which may be embodied as circuitry, on-chip read-only memory, computer memory 506, data storage 508, etc., that cause the processor 504 to perform the steps of the instructions. Processor 504 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 514, executes instructions, and outputs data, again such as via bus 514. In other embodiments, processor 504 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 504 is a non-transitory computing device (e.g., electronic machine comprising circuitry and connections to communicate with other components and devices). Processor 504 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 504). Processor 504 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 504, device 502 may utilize computer memory 506 and/or data storage 508 for the storage of accessible data, such as instructions, values, etc. Communication interface 510 facilitates communication with components, such as processor 504 via bus 514 with components not accessible via bus 514 and may be embodied as a network interface (e.g., ethernet card, wireless networking components, USB port, etc.). Communication interface 510 may be embodied as a network port, card, cable, or other configured hardware device. Additionally or alternatively, human input/output interface 512 connects to one or more interface components to receive and/or present information (e.g., instructions, data, values, etc.) to and/or from a human and/or electronic device. Examples of input/output devices 530 that may be connected to input/output interface include, but are not limited to, keyboard, mouse, trackball, printers, displays, sensor, switch, relay, speaker, microphone, still and/or video camera, etc. In another embodiment, communication interface 510 may comprise, or be comprised by, human input/output interface 512. Communication interface 510 may be configured to communicate directly with a networked component or configured to utilize one or more networks, such as network 520 and/or network 524.

Network 520 may be a wired network (e.g., Ethernet), wireless (e.g., WiFi, Bluetooth, cellular, etc.) network, or combination thereof and enable device 502 to communicate with networked component(s) 522. In other embodiments, network 520 may be embodied, in whole or in part, as a telephony network (e.g., public switched telephone network (PSTN), private branch exchange (PBX), cellular telephony network, etc.).

Additionally or alternatively, one or more other networks may be utilized. For example, network 524 may represent a second network, which may facilitate communication with components utilized by device 502. For example, network 524 may be an internal network to a business entity or other organization, whereby components are trusted (or at least more so) than networked components 522, which may be connected to network 520 comprising a public network (e.g., Internet) that may not be as trusted.

Components attached to network 524 may include computer memory 526, data storage 528, input/output device(s) 530, and/or other components that may be accessible to processor 504. For example, computer memory 526 and/or data storage 528 may supplement or supplant computer memory 506 and/or data storage 508 entirely or for a particular task or purpose. As another example, computer memory 526 and/or data storage 528 may be an external data repository (e.g., server farm, array, "cloud," etc.) and enable device 502, and/or other devices, to access data thereon. Similarly, input/output device(s) 530 may be accessed by processor 504 via human input/output interface 512 and/or via communication interface 510 either directly, via network 524, via network 520 alone (not shown), or via networks 524 and 520. Each of computer memory 506, data storage 508, computer memory 526, data storage 528 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 530 may be a router, a switch, a port, or other communication component such that a particular output of processor 504 enables (or disables) input/output device 530, which may be associated with network 520 and/or network 524, to allow (or disallow) communications between two or more nodes on network 520 and/or network 524. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMS, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method, comprising:
   accessing a query;
   vectorizing the query to obtain a query vector;
   vectorizing a context to obtain context vectors;
   providing the context vectors and the query vector to a neural network;
   receiving from the neural network a response to the query vector corresponding to a closest context vector of the context vectors to the query vector;
   upon determining a distance between the closest context vector and the query vector is greater than a previously determined threshold, retrieving the response comprising an indicium of answerability; and
   providing the response as a human language response.

2. The method of claim 1, wherein the neural network is external from the context.

3. The method of claim 1, wherein the closest context vector is a next nearest neighbor.

4. The method of claim 1, further comprising, upon determining that each of a plurality of closest context vectors are within a previously determined distance to the query vector, receiving a plurality of responses comprising the plurality of closest context vectors.

5. The method of claim 1, wherein providing the context vectors and the query vector to the neural network further comprises providing a chat history comprising at least one previous query, received before the query, and a previous response to at least one previous query received from the neural network.

6. The method of claim 1, wherein providing the context vectors and the query vector to the neural network further comprises providing a closest subset of context vectors determined by cosine distance of the query vector to the context vectors.

7. The method of claim 6, wherein the closest subset of context vectors comprises between five and ten context vectors closest to the query vector.

8. A system comprising:
a processor coupled to a computer memory having stored thereon instructions that cause the processor to perform:
  accessing a query;
  vectorizing the query to obtain a query vector comprising providing the query to an embedding generation service and obtaining therefrom a unique numerical representation of the query and wherein the query vector further comprises the query paired with the unique numerical representation of the query;
  providing the query vector to a vector database to receive therefrom a set of nearest context vectors;
  providing the set of nearest context vectors, the query vector, and the query to a neural network and receiving therefrom a response; and
  providing the response as a human language response; and
  wherein providing the query to the embedding generation service and obtaining therefrom the unique numerical representation of the query further comprises:
    segmenting the query into a number of text chunks; and
    providing each of the number of text chunks to the embedding generation service and obtaining therefrom a number of unique numerical representation for each of the number of text chunks; and
    wherein a number of query vectors, comprising at least the query vector, each comprise one of the number of query vectors, each of the number of query vectors comprising one of the number of text chunks and a corresponding unique numerical representation of one of the number of text chunks.

9. The system of claim 8, wherein the instructions further cause the processor to:
  access context from a repository;
  vectorize the accessed context to obtain context vectors; and
  write the context vectors to the vector database, a subset thereof comprising the set of nearest context vectors.

10. The system of claim 9, wherein the accessed context comprises at least one of a document, a video file, an audio file, an image file, or a computer application data file.

11. The system of claim 9, wherein the set of nearest context vectors comprise a set of next nearest neighbors (NNN).

12. A system comprising:
a processor coupled to a computer memory having stored thereon instructions that cause the processor to perform:
  vectorizing a query to obtain a query vector;
  vectorizing a context to obtain context vectors;
  providing the context vectors and the query vector to a neural network comprising providing a closest subset of context vectors determined by cosine distance of the query vector to the context vectors and wherein the closest subset of context vectors comprises between five and ten context vectors closest to the query vector;
  receiving from the neural network a response to the query vector corresponding to a closest context vector of the context vectors to the query vector; and
  providing the response as a human language response.

13. The system of claim 12, wherein the neural network is external from the context.

14. The system of claim 12, wherein the closest context vector is a next nearest neighbor.

15. The system of claim 12, further comprising, upon determining a distance between the closest context vector and the query vector is greater than a previously determined threshold, retrieving the response comprising an indicium of answerability.

16. The system of claim 15, wherein the indicium of answerability comprises an indicium indicating an inability to provide an answer.

17. The system of claim 12, further comprising, upon determining that each of a plurality of closest context vectors are within a previously determined distance to the query vector, receiving a plurality of responses comprising the plurality of closest context vectors.

18. The system of claim 12, wherein providing the context vectors and the query vector to the neural network further comprises providing a chat history comprising at least one previous query, received before the query, and at least one previous response to the at least one previous query received from the neural network.

19. The system of claim 12, wherein providing the context vectors and the query vector to the neural network further comprises providing a closest subset of context vectors determined by cosine distance of the query vector to the context vectors.

20. The system of claim 19, wherein the closest subset of context vectors comprises between five and ten context vectors closest to the query vector.

* * * * *